Figure 1:
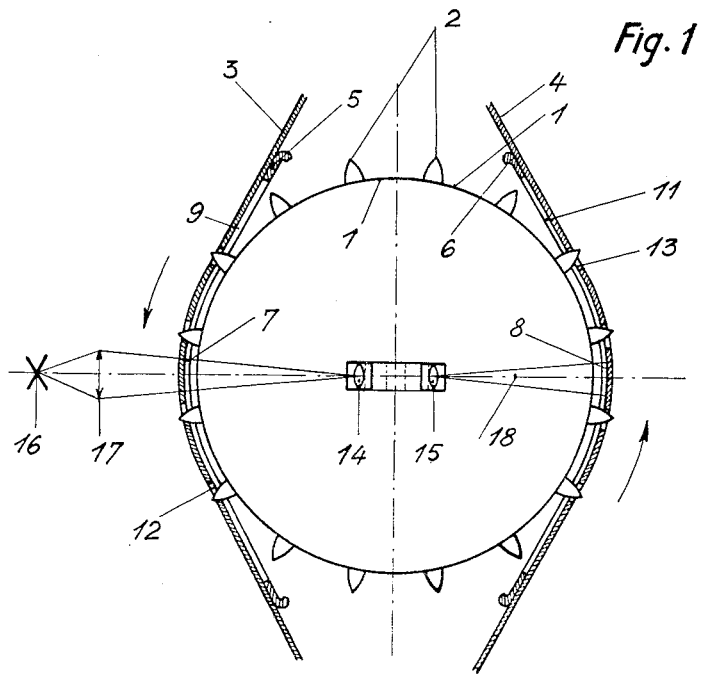

Dec. 5, 1950 — R. F. A. V. D'AVITAYA — 2,532,542
MEANS FOR THE DRIVING OF MOTION-PICTURE FILMS
Filed Dec. 7, 1948 — 2 Sheets-Sheet 1

Inventor:
R. F. A. V. d'Avitaya
by
Paul H. Smaller

Patented Dec. 5, 1950

2,532,542

UNITED STATES PATENT OFFICE 2,532,542

MEANS FOR THE DRIVING OF MOTION-PICTURE FILM

Raymond Fernand Adrien Valentin d'Avitaya, Marseille, France

Application December 7, 1948, Serial No. 63,942
In France December 23, 1947

3 Claims. (Cl. 88—24)

This invention relates to motion picture film driving apparatus, and, more particularly, to film driving apparatus including means, operable upon a film having sprocket holes engaged by a film driving sprocket, to effect travel of the film at an adjustable distance from the sprocket periphery to avoid, or to minimize, slippage between the sprocket and the film.

The theoretical pitch of sprocket holes in motion picture films is generally determined with great accuracy, but the actual pitch thereof always differs from the theoretical one, depending upon the nature of the material from which the film is made; the nature of the sensitive coating and the various treatments and operations that the film is caused to undergo.

The theoretical pitch of the film driving sprocket wheel or drum is also determined with great accuracy so as to correspond to the theoretical pitch of the film sprocket holes. In reality, however, there is always a sharp slippage occurring when the sprocket wheel or drum teeth engage into the corresponding sprocket holes of the film.

The present invention is directed to a method of driving a motion picture film by means of its sprocket wheel or drum, in which the aforesaid slippage is eliminated or minimized, and which consists in moving the film across a peripheral portion of the sprocket wheel or drum and regulating the distance between this portion and the film in such a way as to cause the film trajectory to blend with a predetermined fixed circle instead of the original circle corresponding to the exact pitch of the film sprocket holes.

This method may be employed in all cases of films driven by sprocket wheels or drums where it is desired to avoid, or to a great extent minimize, mechanical shortcomings, such as jerky movements, objectionable friction, wear and tear of sprocket holes, etc., resulting from the discordance between the pitch of sprocket wheels or drums and the pitch of the film sprocket holes.

To this end, the invention drive includes a curved, stationary, but yieldable film guide disposed between the film and the desired peripheral portion of the sprocket wheel or drum and provided with a lateral slot facing this portion to accommodate the sprocket wheel or drum teeth, the distance between the guide and this peripheral portion being adjustable so as to cause the film trajectory to blend with a preset circle instead of the original circle corresponding to the exact pitch of the film sprocket holes, thereby avoiding, or to a great extent minimizing, the aforesaid slippage.

The invention is particularly applicable to apparatus for copying motion picture films by projection. In apparatus of this kind, a single sprocket wheel is adapted to drive, simultaneously but in opposite directions, the original film to be printed and the corresponding raw film to be imprinted, each film being traversed across a separate optical field of a pair of conjugated lens systems arranged between the two films and each supported by the corresponding curved film guide, the two guides each being provided with a picture window facing the corresponding optical lens system.

With the foregoing in mind, it is an object of the present invention to provide an novel driving arrangement for motion picture film in which slippage of the film relative to the driving means is avoided or at least minimized.

Another object is to provide such a driving arrangement for copying motion picture film and effective to insure proper registration of the original and the copy films.

A further object is to provide such a driving arrangement having means for guiding film about a driving sprocket and in an arc having a presettable radius.

Other objects of the present invention will be apparent from the following description and appended claims.

Figure 2:
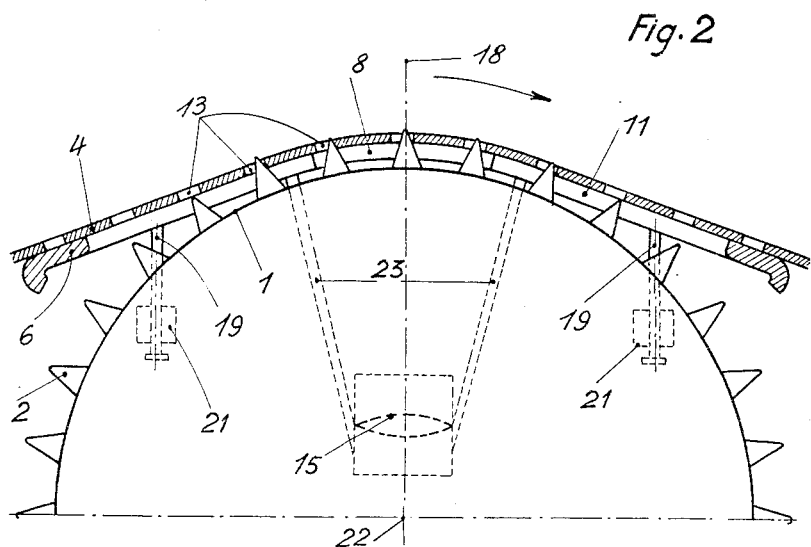
Figure 3:
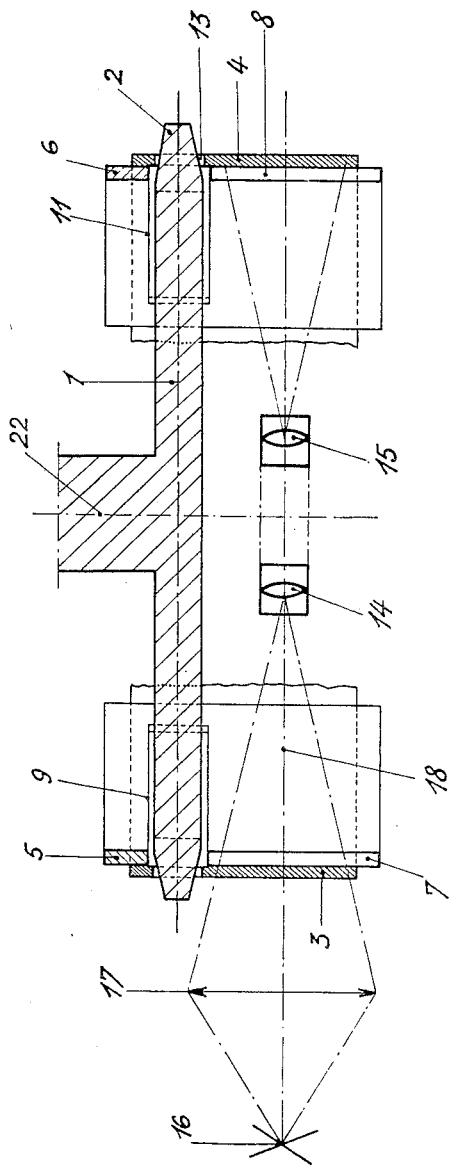

The invention will be described with reference to the accompanying diagrammatic drawings which illustrate the same as applied in apparatus for copying motion picture films by projection and in which Fig. 1 is a view showing a portion of apparatus relating to the present invention;

Fig. 2 is a fragmentary view, on a greatly enlarged scale, corresponding to Fig. 1; and Fig. 3 is a diametral section, also on a greatly enlarged scale, corresponding to Figs. 1 and 2.

In these drawings common elements are designated by like numerals of reference in the various views.

Referring to the drawings, the drive sprocket wheel 1 is provided with teeth 2 extending outward from the periphery of the wheel 1. The films 3 and 4, driven by the wheel 1, are guided by curved, stationary yieldable members 5 and 6, respectively, disposed in appropriate film passages (not shown) and provided with suitable operational windows 7 and 8, respectively, for transmitting the printing light from the original film 3 on to the raw film 4.

It will be seen, more particularly in Fig. 3, that the two guides 5 and 6 are formed with slots 9 and 11, respectively, accommodating the sprocket wheel teeth 2 to permit the latter to engage into the respective sprocket holes 12, 13 of the two films 3, 4.

Arranged between the two windows 7 and 8 are two conjugated or optically interconnected lens systems 14 and 15, respectively, the system 14 being rigidly connected with guide 5 and adapted to concentrate the light emanating from a source 16 and directed by a condenser 17 through the entire window 7 and that portion of the original film 3 which, at a given instant, is applied against this window 7. The system 15 is rigidly connected with the guide 6 and adapted to receive the concentrated light from the system 14 and focus the same upon the entire window 8 and that portion of the raw film 4 which, at said instant, is applied against this window 8.

It will be seen in Fig. 2 that the lens system 15 is rendered rigid with the guide 6 of raw film 4 by means of appropriate stays, diagrammatically indicated by reference 23, and that the guide 6 is prevented from being laterally displaced in planes perpendicular to the plane of the paper by means of links 19 suitably connected therewith and adapted to slide in blocks 21 suitably secured to the frame (not shown) supporting the shaft 22 of the sprocket wheel 1 (Fig. 3).

The lens system 14 is similarly rendered rigid with the guide 5 of original film 3, and the guide 5 is similarly prevented from being laterally displaced in planes perpendicular to the plane of the paper in Fig. 2.

The radial adjustment of the guides 5 and 6 may be effected through the medium of any suitable slow-motion device, such as, for example, a micrometrical screw-operated mechanism, not shown and forming no part of the present invention.

This adjustment will be accurately followed by the respective lens systems 14 and 15 since they are rigidly connected with the respective guides 5 and 6, so that no distortion of images transmitted by these lens systems from the original film 3 on to the raw film 4 can occur, provided that these lens systems have been set in alignment with the optical axis 18 and properly focused, in the outset.

The length and shape of the sprocket wheel teeth are so selected as to have the theoretical drive pitch for an average position of the guide 6 within its very small range of adjustment. The diameter of sprocket wheel 1 is so selected that guide 6 will have an inner limiting position in which film 4, in passing window 8, will follow an arc having a radius equal to the theoretical pitch radius of teeth 2.

As the guide 5 of original film 3 and the corresponding lens system 14 are mounted similarly to the guide 6 and lens system 15, it is possible, without changing the focusing, to adjust radially the passage of each film in such a way as to obtain a drive without irregular slippage of teeth 2, despite the pitch differences presented by the film sprocket holes with respect to the theoretical pitch of the teeth 2.

While a specific embodiment of the invention has been shown and described in detail to illustrate the application of the invention principles, it should be understood that the invention may be otherwise embodied without departing from such principles.

What is claimed is:
1. Motion picture film copying mechanism comprising, in combination, a sprocket drum adapted to drive a developed film and a raw film in diametrically opposite relation and having teeth engageable in apertures in the films; a pair of diametrically opposite guides respectively formed to support the film to be copied and the raw film in spaced parallel relation to the drum periphery; and formed to provide for engagement of said teeth with a film on the guide; each of said guides having a light transmitting window formed therein, and said windows being diametrically opposite each other; independently operable means supporting each guide for radial adjustment relative to the drum periphery; and a pair of mutually cooperable optical systems arranged between said windows and effective to concentrate light directed through the film to be copied and its associated window, and to focus the light upon the raw film through the window associated with the latter.

2. Motion picture film copying mechanism comprising, in combination, a sprocket drum adapted to drive a developed film and a raw film in diametrically opposite relation and having teeth engageable in apertures in the films; a pair of diametrically opposite guides respectively formed to support the film to be copied and the raw film in spaced parallel relation to the drum periphery; and formed to provide for engagement of said teeth with a film on the guide; each of said guides having a light transmitting window formed therein, and said windows being diametrically opposite each other; independently operable means supporting each guide for radial adjustment relative to the drum periphery; and a pair of mutually cooperable optical systems arranged between said windows and effective to concentrate light directed through the film to be copied and its associated window, and to focus the light upon the raw film through the window associated with the latter; each of said optical systems being fixed relatively to one of said guides for radial adjustment therewith to maintain a pre-set optical relation to the film in the guide window, each film being in the guide window in the focal plane of the optical system connected with the said guide.

3. Motion picture film copying mechanism comprising in combination a sprocket drum adapted to drive a developed film and a raw film in diametrically opposite relation and having teeth engageable in apertures of said films; a guide for each film to support the same in spaced relation to the drum periphery and formed to provide for engagement of said drum teeth with the film on the guide; each guide having a light transmitting window formed therein; means supporting each guide for radial adjustment relative to the drum periphery; and an optical projection system including a source of light and light condensing means outside said drum in opposition to the light transmitting window in the guide for the developed film, and an optical objective within said drum between said light transmitting windows, said objective being in mechanical relation with said guides to maintain a pre-set optical relation to said windows.

RAYMOND FERNAND ADRIEN
VALENTIN D'AVITAYA.

REFERENCES CITED

The following references are of record in the file of this patent:

UNITED STATES PATENTS

| Number | Name | Date |
|---|---|---|
| 1,882,014 | Howell | Oct. 11, 1932 |